US011737150B2

(12) United States Patent
Chen et al.

(10) Patent No.: US 11,737,150 B2
(45) Date of Patent: *Aug. 22, 2023

(54) WIRELESS COMMUNICATION METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventors: Wenhong Chen, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,428

(22) Filed: Apr. 21, 2022

(65) Prior Publication Data
US 2022/0248473 A1 Aug. 4, 2022

Related U.S. Application Data

(63) Continuation of application No. 16/813,502, filed on Mar. 9, 2020, now Pat. No. 11,350,464, which is a
(Continued)

(51) Int. Cl.
*H04W 4/00* (2018.01)
*H04W 74/08* (2009.01)
*H04W 72/20* (2023.01)

(52) U.S. Cl.
CPC ....... *H04W 74/0833* (2013.01); *H04W 72/20* (2023.01)

(58) Field of Classification Search
CPC ......... H04W 74/0833; H04W 72/0406; H04W 72/0413; H04W 72/0453; H04W 72/042; H04W 72/1289; H04W 74/002
See application file for complete search history.

(56) References Cited

U.S. PATENT DOCUMENTS

| 8,767,585 B2 | 7/2014 | Pelletier et al. |
| 2011/0045837 A1 | 2/2011 | Kim et al. |
| | (Continued) | |

FOREIGN PATENT DOCUMENTS

| CN | 102150466 A | 8/2011 |
| CN | 102325382 A | 1/2012 |
| | (Continued) | |

OTHER PUBLICATIONS

Guangdong Oppo Mobile Telecommunications Corp., Examination Report, AU2017430531, dated Oct. 17, 2022, 4 pgs.
(Continued)

*Primary Examiner* — Thai D Hoang
(74) *Attorney, Agent, or Firm* — Morgan, Lewis & Bockius LLP

(57) ABSTRACT

A wireless communication method includes: sending, by a terminal device, a random access request to a network device on a high frequency uplink carrier or a supplementary uplink (SUL) carrier deployed at a frequency band lower than the high frequency uplink carrier; and acquiring, by the terminal device, a random access response (RAR) sent by the network device in response to the random access request.

20 Claims, 13 Drawing Sheets

Related U.S. Application Data continuation of application No. PCT/CN2017/101130, filed on Sep. 8, 2017.

(56) References Cited

U.S. PATENT DOCUMENTS

| | | | |
|---|---|---|---|
| 2012/0044897 A1 | 2/2012 | Wager et al. | |
| 2012/0093063 A1 | 4/2012 | Yuan et al. | |
| 2012/0300714 A1 | 11/2012 | Ng et al. | |
| 2013/0242730 A1 | 9/2013 | Pelletier et al. | |
| 2013/0250888 A1 | 9/2013 | Lu | |
| 2016/0037409 A1 | 2/2016 | Jeong et al. | |
| 2016/0270121 A1* | 9/2016 | Bergstrom | H04W 74/0833 |
| 2017/0265227 A1* | 9/2017 | Wang | H04W 72/04 |
| 2017/0273056 A1* | 9/2017 | Papasakellariou | H04W 52/143 |
| 2018/0176961 A1* | 6/2018 | Babaei | H04W 74/0833 |
| 2019/0028905 A1* | 1/2019 | Veeramallu | H04W 4/70 |
| 2019/0028923 A1* | 1/2019 | Futaki | H04W 74/0833 |
| 2019/0254074 A1* | 8/2019 | Jeon | H04W 74/004 |
| 2019/0281636 A1* | 9/2019 | Liu | H04W 72/0446 |
| 2020/0187258 A1* | 6/2020 | Lee | H04W 74/0833 |
| 2020/0229241 A1* | 7/2020 | Jeon | H04W 74/0833 |
| 2020/0351853 A1* | 11/2020 | Xiong | H04L 5/0023 |
| 2020/0404711 A1* | 12/2020 | Zhao | H04W 52/36 |
| 2021/0204326 A1 | 7/2021 | Zhang et al. | |
| 2021/0219163 A1* | 7/2021 | Sha | H04W 76/27 |
| 2021/0227588 A1 | 7/2021 | Jeon et al. | |
| 2021/0258865 A1 | 8/2021 | Park et al. | |

FOREIGN PATENT DOCUMENTS

| | | |
|---|---|---|
| CN | 102474885 A | 5/2012 |
| CN | 103220813 A | 7/2013 |
| CN | 106793106 A | 5/2017 |
| EP | 2288220 A2 | 2/2011 |
| EP | 2351444 A2 | 8/2011 |
| EP | 2351444 B1 | 11/2018 |
| EP | 3637932 A1 | 4/2020 |
| JP | 2012525083 A | 10/2012 |
| KR | 2011-0020170 A | 3/2011 |
| WO | WO2010/124228 A2 | 10/2010 |
| WO | WO2013107171 A1 | 7/2012 |
| WO | WO2017076598 A1 | 5/2017 |
| WO | WO2018156780 A1 | 8/2018 |
| WO | WO2018/237133 A1 | 12/2018 |

OTHER PUBLICATIONS

Guangdong Oppo Mobile Telecommunications Corp., Firtst Office Action, IDP00202002605, dated Oct. 27, 2022, 7 pgs.
Alcatel-Lucent, Alcatel-Lucent Shanghai Bell, "RA procedure on Scell," TSG-RAN WG2#77, R2-120603, Feb. 6-10, 2012, Dresden, Germany, 5 pgs.
Chen, Offfice Action, U.S. Appl. No. 16/813,502, dated Sep. 2, 2021, 10 pgs.
Chen, Notice of Allowance, U.S. Appl. No. 16/813,502, dated Jan. 26, 2022, 9 pgs.
CMCC, "Discussion on RACH configuration and Msg.2 transmission," 3GPP TSG RAN WG1 Meeting #90, R1-1714173, Prague, P.R. Czechia Aug. 21-25, 2017, 4 pgs.
Guangdong Oppo Mobile Telecommunications Corp., Supplementary International Search Report and Written Opinion, PCT/CN2017/101130, dated Apr. 12, 2019, 9 pgs.
Guangdong Oppo Mobile Telecommunications Corp., International Search Report and Written Opinion, PCT/CN2017/101130, dated Apr. 24, 2018, 15 pgs.
Guangdong Oppo Mobile Telecommunications Corp., Communication Pursuant to Artilce 94(3), EP17924071.8, dated Feb. 23, 2021, 10 pgs.
Intel Corporation, "General Aspects for NR Search Space," 3GPP TSG RAN WG1 Meeting #88, R1-1704746Spokane, USA, Apr. 3-7, 2017, 5 pgs.
Guangdong Oppo Mobile Telecommunications Corp., Notification of Reason for Refusal, KR10-2020-7009061, dated Jul. 14, 2021, 11 pgs.
Guangdong Oppo Mobile Telecommunications Corp., Notification Report of Resolution Expert (new law), Chilean Application No. 2020005 67, dated Oct. 22, 2021, 20 pgs.
Guangdong Oppo Mobile Telecommunications Corp., First Office Action, CN202010344349.2, dated May 26, 2021, 16 pgs.
Guangdong Oppo Mobile Telecommunications Corp., Notification to Grant Patent Right for Invention, CN202010344349.2, dated Sep. 1, 2021, 7 pgs.
Guangdong Oppo Mobile Telecommunications Corp., Examination Report, IN202027015383, dated Nov. 2, 2021, 7 pgs.
Notice of Reasons for Refusal, JP2020-513765, dated Jul. 29, 2021, 12 pgs.
Guangdong Oppo Mobile Telecommunications Corp., Decision to Grant a Patent, JP2020-513765, dated Mar. 8, 2022, 6 pgs.
Guangdong Oppo Mobile Telecommunications Corp., Notice of Final Rejection, KR1020207009061, dated Jan. 3, 2022, 8 pgs.
Guangdong Oppo Mobile Telecommunications Corp., Notification of Reason for Refusal, KR1020227003686, dated Mar. 18, 2022, 13 pgs.
Guangdong Oppo Mobile Telecommunications Corp., First Office Action, TW107131640, dated Sep. 30, 2021, 12 pgs.
3GPP TSG RAN WG1 Meeting #89, R1-1709732, Way forward on the support of Supplementary Uplink in NR, Hangzhou, P.R. China, May 15-19, 2017, 2 pgs.
LG Electronics, "Remaining details on UL sharing between LTE and NR," 3GPP TSG RAN WG1 Meeting Ad-Hoc, R1-1710354, Qingdao, P.R. China Jun. 27-30, 2017, 6 pgs.
MediaTeck Inc., "RAR design supporting multiple preamble transmission," 3GPP TSG-RAN WG2 Meeting #99, R2-1708049, Berlin, Germany, Aug. 21-25, 2017, 6 pgs.
MediaTeck Inc., Support Initial Access on Supplementary Uplink, 3GPP TSG-RAN WG2 Meeting #99, R2-1708050, Berlin, Germany, Aug. 21-25, 2017, 3 pgs.
ZTE, ZTE Microelectronics, "Search Space Design for NR-PDCCH," 3GPP TSG RAB WG1 Meeting #AH_NR2, R1-1710107, Qingdao, China, Jun. 26-30, 2017, 5 pgs.
Guangdong Oppo Mobile Telecommunications Corp., IL273131, First Office Action, dated Oct. 31, 2022, 5 pgs.
Huawei, HiSilicon, "RAR reception for eMTC", 3GPP TSG RAN WG2 Meeting #98, R2-1706106, Hangzhou, P.R. China, May 15-19, 2017, 4 pgs.
CMCC, "System Information for supporting the supplementary uplink (SUL) frequency", 3GPP TSG-RAN WG2 NR AdHoc, R2-1707461, Qingdao, China, Jun. 27-29, 2017, 1 pg.
CMCC, "Discussion on SUL and UL sharing band definition", 3GPP TSG-RAN WG4 Meeting NR#2, R4-1706706, Qingdao, China, May 27-29, 2017, 6 pgs.
RAN WG1, "[Draft] LS on the support of supplementary uplink in NR", 3GPP TSG RAN WG1 Meeting #89, R1-1709843, Hangzhou, China, May 15-19, 2017, 1 pg.
Huawei, "NR band definition for NR-LTE co-existence", 3GPP TSG-RAN WG4 Meeting NR #2, R4-1706677, Qingdao, China, Jun. 27-29, 2017, 3 pgs.
RAN WG1, "LS on the support of supplementary uplink in NR", 3GPP TSG RAN WG2#NR_AdHoc#2, R2-1706308, Qingdao, China, Jun. 27-29, 2017, 1 pg.
ZTE Corporation, "TP on TS 38.104: NR Operating Bands for below and above 6GHz", 3GPP TSG-RAN WG4 Meeting #84, R4-1707962, Berlin, Germany, Aug. 21-25, 2017, 3 pgs.
RAN4-NR#2 Meeting report, 3GPP TSG-RAN WG4 Meeting #84, R4-1707002, Berlin, Germany, Aug. 21-25, 2017, 227 pgs.
Huawei, HiSilicon, "Calculation of RA-RNTI", 3GPP TSG-RAN WG2 Meeting #99, R2-1708968, Berlin, Germany, Aug. 21-25, 2017, 2 pgs.
Guangdong Oppo Mobile Telecommunications Corp., Request for the Submission of an Opinion, 1st Office Action, KR10-2022-7041504, dated Feb. 7, 2023, 12 pgs.

* cited by examiner

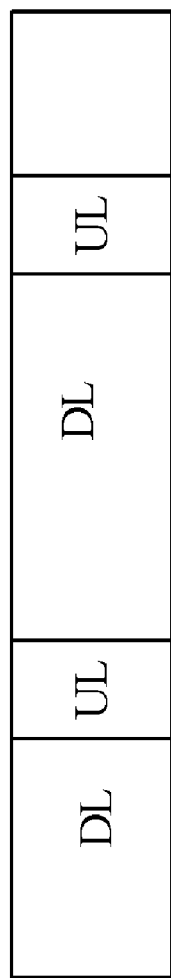
FIG. 5

WIRELESS COMMUNICATION METHOD, NETWORK DEVICE AND TERMINAL DEVICE

CROSS-REFERENCE TO RELATED APPLICATION

This application is a continuation application of U.S. application Ser. No. 16/813,502, filed Mar. 9, 2020, which is a continuation application of PCT Patent Application No. PCT/CN2017/101130, entitled "WIRELESS COMMUNICATION METHOD, NETWORK DEVICE AND TERMINAL DEVICE" filed on Sep. 8, 2017, the entire contents of both of which are incorporated by reference in its entirety.

TECHNICAL FIELD

This application relates to the communications field, and more specifically, to a wireless communication method, a network device, and a terminal device.

BACKGROUND

In a Long Term Evolution (Long Term Evolution, LTE) system, there are a fixed uplink carrier and a fixed downlink carrier (the uplink carrier and the downlink carrier may at least partially overlap in frequency domain). A terminal device and a network may perform uplink and downlink communication by using the fixed uplink carrier and downlink carrier respectively. The terminal may perform random access by using the fixed uplink carrier.

A future communications system requires relatively high communication performance.

Therefore, how to improve communication performance in terms of random access is a problem that needs to be resolved urgently.

SUMMARY

Embodiments of this application provide a wireless communication method and a device, to improve communication performance in terms of random access.

A first aspect provides a wireless communication method, including:

receiving, by a network device, a first random access request sent by a terminal device on a first uplink carrier; and sending, by the network device, a first random access response in response to the first random access request based on the first uplink carrier.

Therefore, in the embodiments of this application, a random access response is fed back based on an uplink carrier on which a random access request is sent, so that if there is a plurality of uplink carriers, a source of the random access request corresponding to the random access response can be distinguished when possible.

With reference to the first aspect, in a possible implementation of the first aspect, the sending, by the network device, a first random access response in response to the first random access request based on the first uplink carrier includes:

determining, by the network device, at least one of the following based on the first uplink carrier:

a resource required to send the first random access response, a first random access radio network temporary identity RA-RNTI required to send the first random access response, and information for indicating a random access request source in the first random access response; and sending the first random access response based on the determined at least one.

With reference to the first aspect or any possible implementation described above, in another possible implementation of the first aspect, the resource required to send the first random access response includes: a control resource set CORESET or search space to which a control channel carrying the first random access response belongs.

With reference to the first aspect or any possible implementation described above, in another possible implementation of the first aspect, the control resource set CORESET or search space to which the control channel carrying the first random access response belongs is different from a CORESET or search space to which a control channel carrying a second random access response belongs, and the second random access response is a response to a second random access request on a second uplink carrier.

With reference to the first aspect or any possible implementation described above, in another possible implementation of the first aspect, a calculation formula of the first RA-RNTI is different from a calculation formula of a second RA-RNTI, or one or more parameters in a calculation formula of the first RA-RNTI are different from one or more parameters in a calculation formula of a second RA-RNTI, where the second RA-RNTI is an RA-RNTI required for the second random access response to the second random access request on the second uplink carrier.

With reference to the first aspect or any possible implementation described above, in another possible implementation of the first aspect, information carried in a random access request source field of the first random access response is different from information carried in a random access request source field of the second random access response, where the second random access response is the response to the second random access request on the second uplink carrier, and the random access request source field indicates an uplink carrier on which the random access request is located.

With reference to the first aspect or any possible implementation described above, in another possible implementation of the first aspect, the first random access response carries a random access request source field, and the second random access response does not carry a random access request source field, where the second random access response is the response to the second random access request on the second uplink carrier, and the random access request source field indicates that an uplink carrier on which the random access request is located is the first uplink carrier.

With reference to the first aspect or any possible implementation described above, in another possible implementation of the first aspect, the first uplink carrier and the second uplink carrier belong to different frequency bands.

With reference to the first aspect or any possible implementation described above, in another possible implementation of the first aspect, the method further includes:

sending, by the network device, configuration information to the terminal device, where the configuration information is used to indicate at least one of the resource required to send the first random access response, a determining manner or one or more parameters of the first random access radio network temporary identity required to send the first random access response, and the information carried in the first random access response.

A second aspect provides a wireless communication method, including:

determining, by a network device, configuration information during random access for each of a plurality of uplink carriers; and sending, by the network device, the configuration information for each uplink carrier to a terminal device.

Therefore, the network device configures the configuration information during random access for each of the plurality of uplink carriers for the terminal device, so that during random access, the terminal device can use the configuration information corresponding to each uplink carrier to perform random access.

With reference to the second aspect, in a possible implementation of the second aspect, the configuration information includes a time domain resource and/or a frequency domain resource used to send a random access request on each uplink carrier, where RA-RNTIs corresponding to time domain resources and/or frequency domain resources used to send a random access request on different uplink carriers are at least partially different.

With reference to the second aspect or any possible implementation described above, in another possible implementation of the second aspect, at least one of the following configuration information during random access determined respectively for different uplink carriers is different:

a time frequency resource occupied by a random access request and/or a sequence included in a random access request;

a resource required to send a random access response; and a determining manner or one or more parameters of a random access radio network temporary identity for sending a random access response.

With reference to the second aspect or any possible implementation described above, in another possible implementation of the second aspect, the resource required to send the random access response includes: a control resource set CORESET or search space to which a control channel carrying the random access response belongs.

With reference to the second aspect or any possible implementation described above, in another possible implementation of the second aspect, control channels of random access responses corresponding to random access requests on different uplink carriers belong to different CORESETs or search spaces.

With reference to the second aspect or any possible implementation described above, in another possible implementation of the second aspect, RA-RNTIs for random access responses corresponding to random access requests on different uplink carriers have different calculation formulas or one or more different parameters in a calculation formula.

With reference to the second aspect or any possible implementation described above, in another possible implementation of the second aspect, the configuration information includes a configuration for the following: an indication of a random access request source in a random access response corresponding to a random access request transmitted on each uplink carrier.

With reference to the second aspect or any possible implementation described above, in another possible implementation of the second aspect, random access request source fields of random access responses corresponding to random access requests on different uplink carriers carry different information, where the random access request source field indicates an uplink carrier on which the random access request is located.

With reference to the second aspect or any possible implementation described above, in another possible implementation of the second aspect, the plurality of uplink carriers includes a first uplink carrier and a second uplink carrier, a first random access response carries a random access request source field, and a second random access response does not carry a random access request source field, where the first random access response is a response to a first random access request on the first uplink carrier, the second random access response is a response to a second random access request on the second uplink carrier, and the random access request source field indicates that an uplink carrier on which the random access request is located is the first uplink carrier.

With reference to the second aspect or any possible implementation described above, in another possible implementation of the second aspect, the plurality of uplink carriers belongs to different frequency bands respectively.

A third aspect provides a wireless communication method, including:

sending, by a terminal device, a first random access request to a network device on a first uplink carrier; and acquiring, by the terminal device based on the first uplink carrier, a first random access response sent by the network device in response to the first random access request.

With reference to the third aspect, in a possible implementation of the third aspect, the acquiring, by the terminal device based on the first uplink carrier, a first random access response sent by the network device in response to the first random access request includes:

determining, by the terminal device, at least one of the following based on the first uplink carrier:

a resource occupied by the first random access response, a first random access radio network temporary identity RA-RNTI for the first random access response, and information for indicating a random access request source in the first random access response; and acquiring the first random access response based on the determined at least one.

With reference to the third aspect or any possible implementation described above, in another possible implementation of the third aspect, the resource occupied by the first random access response includes: a CORESET or search space to which a control channel carrying the first random access response belongs.

With reference to the third aspect or any possible implementation described above, in another possible implementation of the third aspect, the control resource set CORESET or search space to which the control channel carrying the first random access response belongs is different from a CORESET or search space to which a control channel carrying a second random access response belongs, and the second random access response is a response to a second random access request on a second uplink carrier.

With reference to the third aspect or any possible implementation described above, in another possible implementation of the third aspect, a calculation formula of the first RA-RNTI is different from a calculation formula of a second RA-RNTI, or one or more parameters in a calculation formula of the first RA-RNTI are different from one or more parameters in a calculation formula of a second RA-RNTI, where the second RA-RNTI is an RA-RNTI required for the second random access response to the second random access request on the second uplink carrier.

With reference to the third aspect or any possible implementation described above, in another possible implementation of the third aspect, information carried in a random access request source field of the first random access response is different from information carried in a random access request source field of the second random access response, where the second random access response is the response to the second random access request on the second uplink carrier, and the random access request source field indicates an uplink carrier on which the random access request is located.

With reference to the third aspect or any possible implementation described above, in another possible implementation of the third aspect, the first random access response carries a random access request source field, and the second random access response does not carry a random access request source field, where the second random access response is the response to the second random access request on the second uplink carrier, and the random access request source field indicates that an uplink carrier on which the random access request is located is the first uplink carrier.

With reference to the third aspect or any possible implementation described above, in another possible implementation of the third aspect, the first uplink carrier and the second uplink carrier belong to different frequency bands.

With reference to the third aspect or any possible implementation described above, in another possible implementation of the third aspect, the method further includes:

receiving, by the terminal device, configuration information sent by the network device, where the configuration information is used to indicate at least one of a resource occupied to send the first random access response, a determining manner or one or more parameters of the first random access radio network temporary identity RA-RNTI for the first random access response, and the information carried in the first random access response.

A fourth aspect provides a wireless communication method, including:

receiving, by a terminal device, configuration information during random access configured by a network device for each of a plurality of uplink carriers; and performing random access on at least one uplink carrier of the plurality of uplink carriers based on the configuration information.

With reference to the fourth aspect, in a possible implementation of the fourth aspect, the configuration information includes a time domain resource and/or a frequency domain resource used to send a random access request on each of the plurality of uplink carriers, where RA-RNTIs corresponding to time domain resources and/or frequency domain resources used to send a random access request on different uplink carriers are at least partially different.

With reference to the fourth aspect, in another possible implementation of the fourth aspect, at least one of the following configuration information during random access determined respectively for different uplink carriers is different:

a time frequency resource occupied by a random access request and/or a sequence included in a random access request;

a resource required to send a random access response; and a determining manner or one or more parameters of a random access radio network temporary identity for sending a random access response.

With reference to the fourth aspect or any possible implementation described above, in another possible implementation of the fourth aspect, the resource required to send the random access response includes: a CORESET or search space to which a control channel carrying the random access response belongs.

With reference to the fourth aspect or any possible implementation described above, in another possible implementation of the fourth aspect, control channels of random access responses corresponding to random access requests on different uplink carriers belong to different control resource sets CORESETs or search spaces.

With reference to the fourth aspect or any possible implementation described above, in another possible implementation of the fourth aspect, RA-RNTIs for random access responses corresponding to random access requests on different uplink carriers have different calculation formulas or one or more different parameters in a calculation formula.

With reference to the fourth aspect or any possible implementation described above, in another possible implementation of the fourth aspect, the configuration information includes a configuration for the following: an indication of a random access request source in a random access response corresponding to a random access request transmitted on each uplink carrier.

With reference to the fourth aspect or any possible implementation described above, in another possible implementation of the fourth aspect, random access request source fields of random access responses corresponding to random access requests on different uplink carriers carry different information, where the random access request source field indicates an uplink carrier on which the random access request is located.

With reference to the fourth aspect or any possible implementation described above, in another possible implementation of the fourth aspect, the plurality of uplink carriers includes a first uplink carrier and a second uplink carrier, a first random access response carries a random access request source field, and a second random access response does not carry a random access request source field, where the first random access response is a response to a first random access request on the first uplink carrier, the second random access response is a response to a second random access request on the second uplink carrier, and the random access request source field indicates that an uplink carrier on which the random access request is located is the first uplink carrier.

With reference to the fourth aspect or any possible implementation described above, in another possible implementation of the fourth aspect, the plurality of uplink carriers belongs to different frequency bands respectively.

A fifth aspect provides a network device, configured to perform the foregoing method in the first aspect or any possible implementation of the first aspect or the second aspect or any possible implementation of the second aspect. Specifically, the network device includes functional modules configured to perform the foregoing method in the first aspect or any possible implementation of the first aspect or the second aspect or any possible implementation of the second aspect.

A sixth aspect provides a terminal device, configured to perform the foregoing method in the third aspect or any possible implementation of the third aspect or the fourth aspect or any possible implementation of the fourth aspect. Specifically, the terminal device includes functional modules configured to perform the foregoing method in the second aspect or any possible implementation of the second aspect or the fourth aspect or any possible implementation of the fourth aspect.

A seventh aspect provides a network device, including a processor, a memory, and a transceiver. The processor, the memory, and the transceiver communicate with each other through internal connection channels to transfer control and/or data signals, to enable the network device to perform the foregoing method in the first aspect or any possible implementation of the first aspect or the third aspect or any possible implementation of the third aspect.

An eighth aspect provides a terminal device, including a processor, a memory, and a transceiver. The processor, the memory, and the transceiver communicate with each other through internal connection channels to transfer control and/or data signals, to enable the terminal device to perform the foregoing method in the second aspect or any possible implementation of the second aspect or the fourth aspect or any possible implementation of the fourth aspect.

A ninth aspect provides a computer readable medium, configured to store a computer program, the computer program including an instruction used to perform any method in the foregoing or any possible implementation.

A tenth aspect provides a computer program product including an instruction, where the instruction, when running on a computer, enables the computer to perform any method in the foregoing or the method in any possible implementation.

BRIEF DESCRIPTION OF THE DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

FIG. 5 is a schematic diagram of a link carrier in terms of resource allocation according to an embodiment of this application.

DETAILED DESCRIPTION

The technical solutions in the embodiments of this application are described with reference to the accompanying drawings in the embodiments of this application below. Apparently, the described embodiments are some but not all of the embodiments of this application. All other embodiments obtained by a person of ordinary skill in the art based on the embodiments of this application without creative efforts shall fall within the protection scope of this application.

The technical solutions according to the embodiments of this application may be applied to a variety of communications systems, such as a Global System for Mobile communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short), a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short), a Universal Mobile Telecommunications system (Universal Mobile Telecommunications system, "UMTS" for short), a Worldwide Interoperability for Microwave Access (Worldwide Interoperability for Microwave Access, "WiMAX" for short) communications system, a future 5G system (which may also be referred to as a New Radio (New Radio, NR) system), or the like.

It should be understood that terms "system" and "network" in this specification are usually interchangeably used in this specification. The term "and/or" in this specification is only an association relationship for describing the associated objects, and represents that three relationships may exist. For example, A and/or B may represent the following three cases: only A exists, both A and B exist, and only B exists. In addition, the character "/" in this specification generally indicates an "or" relationship between the associated objects.

Figure 1:
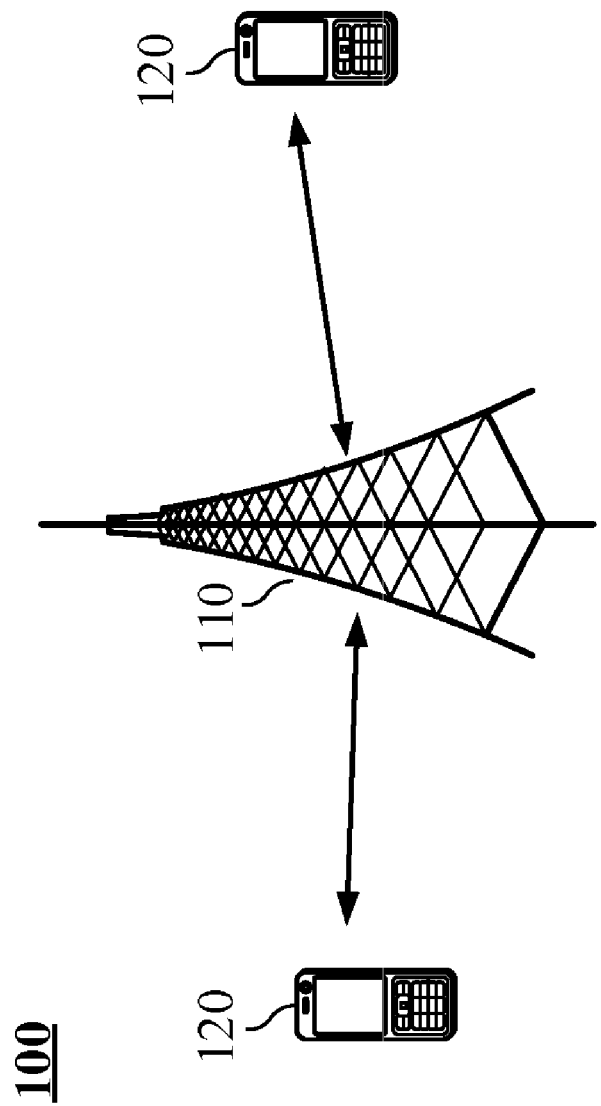
FIG. 1 is a schematic diagram of a wireless communications system according to an embodiment of this application.

FIG. 1 shows a wireless communications system 100 according to an embodiment of this application.

It should be understood that FIG. 1 exemplarily shows one network device and two terminal devices. Optionally, the wireless communications system 100 may include a plurality of network devices and another quantity of terminal devices may be included in a coverage area of each network device. This is not limited in this embodiment of this application.

Optionally, the wireless communications system 100 may further include another network entity such as a network controller or a mobility management entity. This is not limited in this embodiment of this application.

As shown in FIG. 1, the wireless communications system 100 may include a network device 110. The network device 110 may be a device communicating with a terminal device. The network device 110 may provide communication coverage for a specific geographic area, and may communicate with a terminal device (for example, UE) located within the coverage area. Optionally, the network device 110 may be a base transceiver station (Base Transceiver Station, BTS) in a GSM system or a CDMA system, may be a NodeB (NodeB, NB) in a WCDMA system, or may be an evolved Node B (Evolved Node B, eNB or eNodeB) in an LTE system or a wireless controller in a cloud radio access network (Cloud Radio Access Network, CRAN), or the network device may be a relay station, an access point, an in-vehicle device, a wearable device, a network-side device in a future 5G network, a network device in a future evolved public land mobile network (Public Land Mobile Network, PLMN), or the like.

The wireless communications system 100 further includes at least one terminal device 120 located within a coverage area of the network device 110. The terminal device 120 may be mobile or fixed. Optionally, the terminal device 120 may be an access terminal, user equipment (User Equipment, UE), a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, a terminal device in a future evolved PLMN, or the like.

Optionally, the terminal device 120 may perform device to device (Device to Device, D2D) communication.

Optionally, a 5G system or network may be further referred to as a new radio (New Radio, NR) system or network.

A high frequency band is an important alternative frequency band for deploying a 5G (NR) network. Because a frequency band is relatively high, a coverage area is relatively limited (as compared with low frequency LTE). In a downlink (Downlink, DL), because a network device has a relatively high transmit power, large-scale multiple input multiple output (Multiple Input Multiple Output, MIMO) (hybrid Beamforming) or the like improves DL coverage. Because a terminal device has a limited transmit power, UL coverage will become the bottleneck.

Therefore, one uplink (Uplink, UL) carrier may be deployed at a low frequency and used to perform NR transmission. The UL carrier may be referred to as a supplementary uplink (Supplementary Uplink, SUL) carrier. In this case, NR has at least two UL carriers. To be specific, one UL carrier is the SUL carrier, and the other UL carrier is a high frequency UL carrier (which may be referred to as an NR dedicated UL (dedicated UL) carrier).

Figure 2:
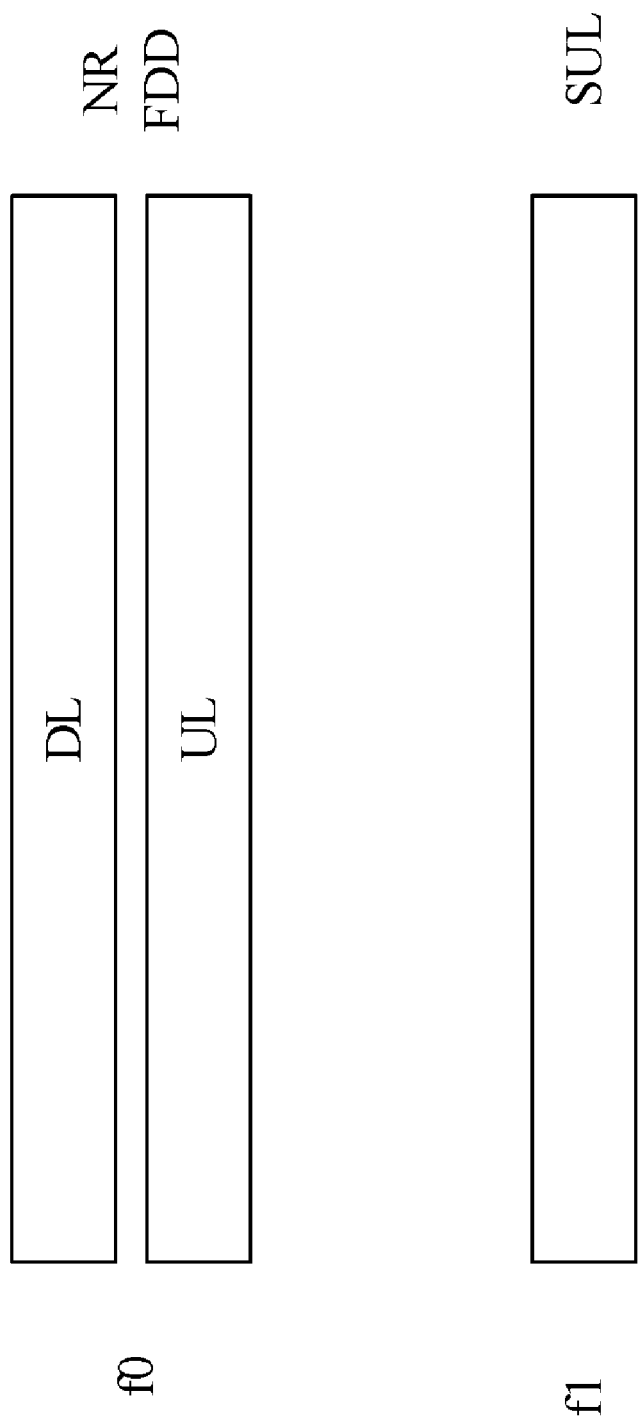
FIG. 2 is a schematic diagram of a link carrier in terms of resource allocation according to an embodiment of this application.
Figure 3:
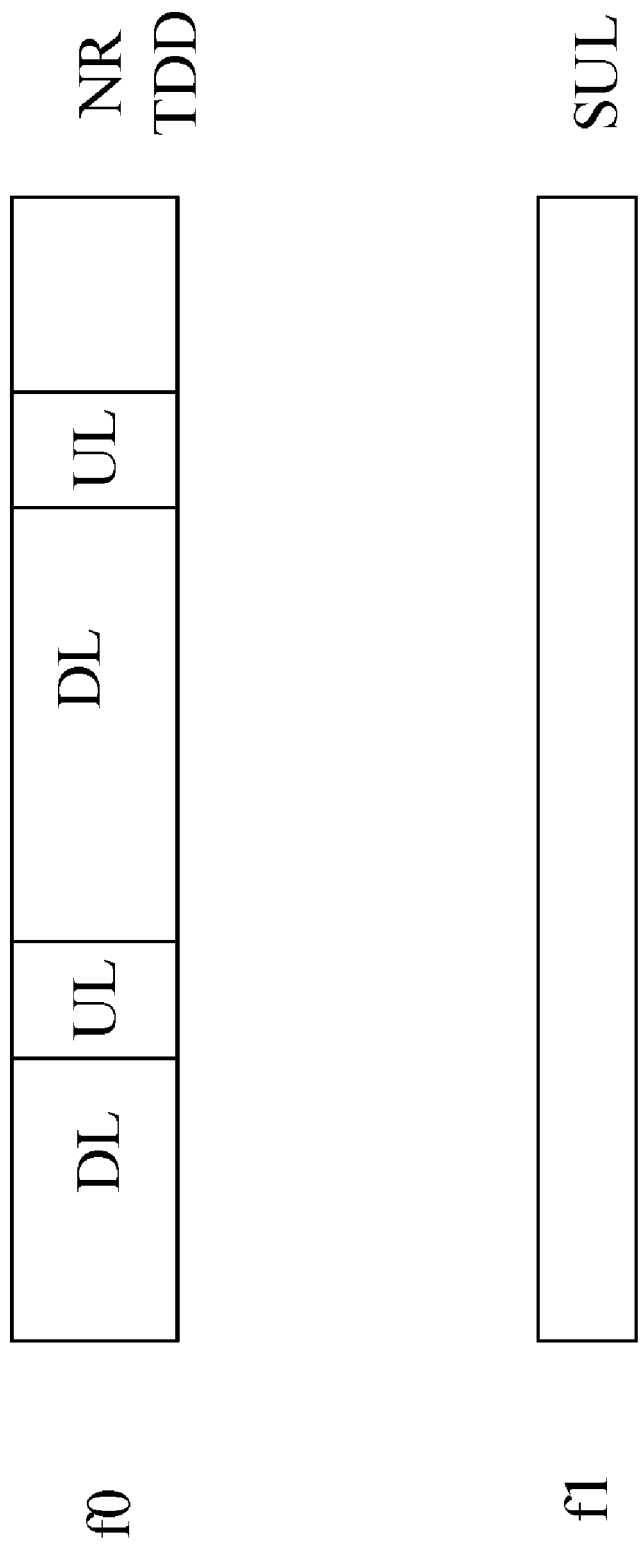
FIG. 3 is a schematic diagram of a link carrier in terms of resource allocation according to an embodiment of this application.

For example, as shown in FIG. 2 and FIG. 3, the NR system may include a high frequency UL carrier that belongs to a frequency band f0 and a low frequency UL carrier that belongs to a frequency band f1.

As shown in FIG. 2, frequency division multiplexing (Frequency Division Duplexing, FDD) is performed on the high frequency UL carrier that belongs to the frequency band f0 and a high frequency DL carrier that belongs to the frequency band f0. Alternatively, as shown in FIG. 3, time division multiplexing (Time Division Duplexing, TDD) is performed on the high frequency UL carrier that belongs to the frequency band f0 and a high frequency DL carrier that belongs to the frequency band f1.

Figure 4:
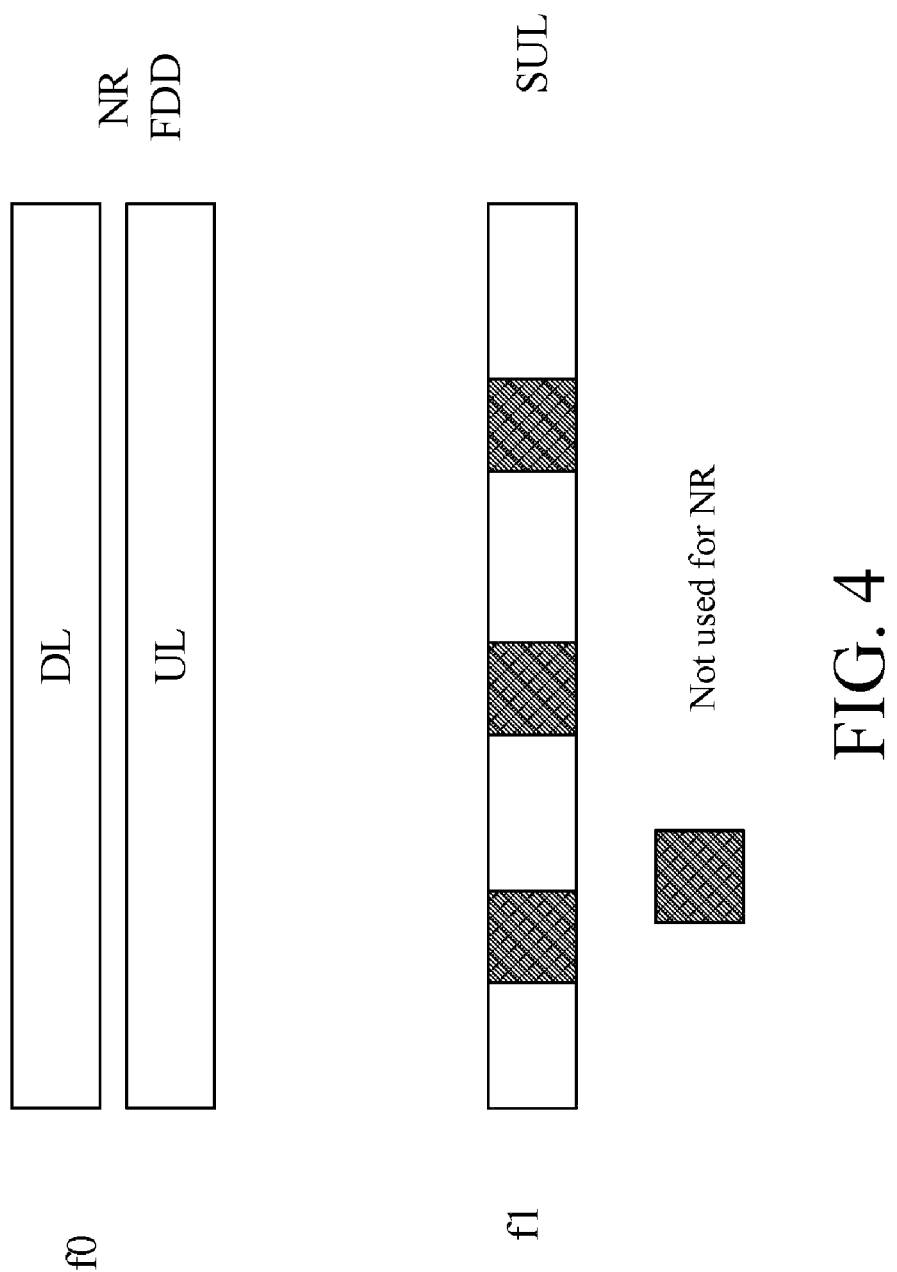
FIG. 4 is a schematic diagram of a link carrier in terms of resource allocation according to an embodiment of this application.

Optionally, the SUL carrier may further share a spectrum resource with the LTE system. To be specific, in f1, only one or more resources may be used for NR, and the other resources are used for LTE. Resources may be shared in a frequency division multiplexing (Frequency Division Multiplexing, FDM) or a time division multiplexing (Time Division Multiplexing, TDM) manner (for example, a TDM manner shown in FIG. 4 and FIG. 5).

It should be understood that although in the foregoing, an example in which the NR system has two UL carriers is used for description, this embodiment of this application is not limited thereto. For example, the NR system may alternatively have three or more UL carriers.

It should be further understood that in this embodiment of this application, a plurality of UL carriers included in the NR system may all be used by the terminal device to perform uplink transmission. However, during configuration, it may be only configured that the terminal device uses one or more UL carriers to perform uplink transmission.

Optionally, a quantity of UL carriers used by the terminal device and a specific UL carrier that are configured by the network device may change dynamically.

Optionally, after initiating a PRACH preamble, the terminal device monitors (monitor) a random access request (Random Access Request, RAR) of the network device at a corresponding position. The network device uses a random access radio network temporary identity (Random Access Radio Network Temporary Identity, RA-RNTI) to send a random access response. The terminal device uses a same RA-RNTI to receive the random access response.

In the LTE system, the RA-RNTI may be calculated in the following three manners.

In the first manner: $RA\text{-}RNTI = 1 + t\_id + 10*f\_id$   Formula 1 where t_id is an index of the first subframe in a specified PRACH resource, and f_id is an index of a specified PRACH of the subframe in ascending order in frequency domain.

In the second manner: $RA\text{-}RNTI =$   Formula 2
$$1 + t\_id + 10*f\_id + 60*(SFN\_id \bmod(W\max/10))$$

where t_id is an index of the first subframe in a specified PRACH resource, f_id is an index of a specified PRACH of the subframe in ascending order in frequency domain, SFN_id is an index of the first radio frame of the specified PRACH resource, and Wmax is 400.

In the third manner: $RA\text{-}RNTI = 1 + \text{floor}(SFN\_id/4)$   Formula 3 where SFN_id is an index of the first radio frame of the specified PRACH resource.

It should be understood that the foregoing manners of acquiring an RA-RNTI are only several implementations. There may be further other implementations in this embodiment of this application.

A manner of acquiring an RA-RNTI in the NR system may be the same as or different from a manner of acquiring an RA-RNTI in the LTE system.

If two terminal devices send a random access request (including a random access code, that is, a random access preamble) respectively on an NR dedicated UL carrier and a SUL carrier, the two terminal devices may receive the same RAR, and a UL carrier on which a preamble that corresponds to the RAR is sent cannot be distinguished.

Therefore, for the foregoing scenario in which there is a plurality of uplink carriers, the embodiments of this application provide the following solutions for random access.

Figure 6:
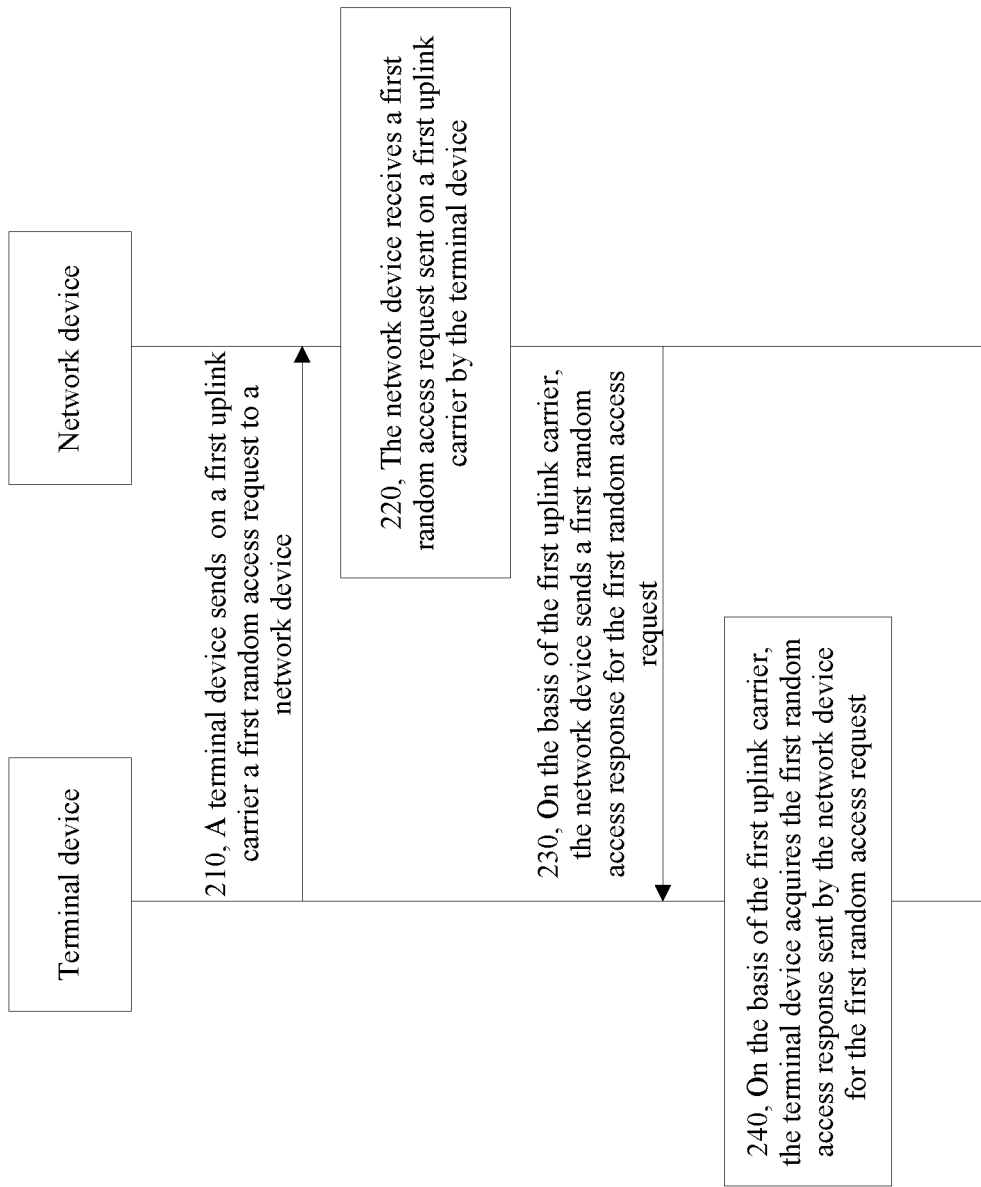
FIG. 6 is a schematic flowchart of a wireless communication method according to an embodiment of this application.

FIG. 6 is a schematic flowchart of a wireless communication method 200 according to an embodiment of this application. The method 200 may be optionally applied to the system shown in FIG. 1, but is not limited thereto. The method 200 includes at least some of the following content.

210. A terminal device sends a first random access request to a network device on a first uplink carrier.

220. The network device receives the first random access request sent by the terminal device on the first uplink carrier.

230. The network device sends a first random access response in response to the first random access request based on the first uplink carrier.

240. The terminal device acquires, based on the first uplink carrier, the first random access response sent by the network device in response to the first random access request.

Therefore, in this embodiment of this application, a random access response is fed back based on an uplink carrier on which a random access request is sent, so that if there is a plurality of uplink carriers, a source of the random access request corresponding to the random access response can be distinguished when possible.

Optionally, the network device determines at least one of the following based on the first uplink carrier: a resource required to send the first random access response, a first random access radio network temporary identity RA-RNTI required to send the first random access response, and information for indicating a random access request source in the first random access response; and sends the first random access response based on the determined at least one. Correspondingly, based on the first uplink carrier, the terminal device determines at least one of the following: the resource occupied by the first random access response, the first random access radio network temporary identity RA-RNTI for the first random access response, and the information for indicating the random access request source in the first random access response; and acquires the first random access response based on the determined at least one.

Optionally, the network device sends configuration information to the terminal device, where the configuration information is used to indicate at least one of the resource required to send the first random access response, a determining manner or one or more parameters of the first random access radio network temporary identity required to send the first random access response, and the information (that is, information that indicates a random access request source) carried in the first random access response.

It should be understood that the resource required to send the first random access response, the determining manner or one or more parameters of the first random access radio network temporary identity required to send the first random access response, and the information carried in the first random access response may alternatively be preset on the terminal device and do not need to be configured by the network device.

Optionally, in this embodiment of this application, the resource that is determined based on the first uplink carrier and is required to send the first random access response includes: a control resource set CORESET or search space to which a control channel carrying the first random access response belongs.

Optionally, the control resource set (Control Resource Set, CORESET) or search space (Search space) to which the control channel carrying the first random access response belongs is different from a CORESET or search space to which a control channel carrying a second random access response belongs, and the second random access response is a response to a second random access request on a second uplink carrier.

Specifically, after sending a physical random access channel (Physical Random Access Channel, PRACH) preamble (preamble) on a UL carrier, UE needs to monitor (monitor) a random access response (Random Access Response, RAR) of a network. In NR, a control channel (NR-PDCCH) first needs to be detected before a random access response can be received. The network device configures a control channel differently to enable detection of different control channels after preambles are sent on different ULs. Some specific configuration options are as follows:

In a manner, a CORESET 1 or a CORESET group 1 (which includes a plurality of CORESETs) is a control channel resource used to receive an RAR corresponding to a preamble sent in an NR dedicated UL, and a CORESET 2 or a CORESET group 2 (which includes a plurality of CORESETs) includes a control channel resource used to receive an RAR corresponding to a preamble sent in an NR SUL.

In another manner, a search space 1 includes a control channel resource used to receive an RAR corresponding to a preamble sent in an NR dedicated UL, and a search space 2 includes a control channel resource used to receive an RAR corresponding to a preamble sent in an NR SUL.

Optionally, information carried in a random access request source field of the first random access response is different from information carried in a random access request source field of the second random access response, where the second random access response is the response to the second random access request on the second uplink carrier, and the random access request source field indicates an uplink carrier on which the random access request is located.

Specifically, the network device adds information to a random access response to indicate a UL to which a corresponding random access request belongs. For example, the RAR indicates that the corresponding random access request belongs to an NR dedicated UL or a SUL.

Optionally, the first random access response carries a random access request source field, and the second random access response does not carry a random access request source field, where the second random access response is the response to the second random access request on the second uplink carrier, and the random access request source field indicates an uplink carrier on which the random access request is located is the first uplink carrier.

Specifically, the network device adds information to a random access response to indicate a UL to which a corresponding random access request belongs. For example, the RAR does not indicate a UL to which a corresponding random access request belongs, the random access request correspondingly belongs to a default UL (for example, an NR dedicated UL). If the RAR indicates a UL, the random access request belongs to the indicated UL (for example, a SUL).

Optionally, in this embodiment of this application, the first uplink carrier and the second uplink carrier described above belong to different frequency bands. For example, the first uplink carrier is the SUL carrier described in FIG. 2 to FIG. 5, and the second uplink carrier is the dedicated UL carrier described in FIG. 2 to FIG. 5.

Optionally, a calculation formula of the first RA-RNTI is different from a calculation formula of a second RA-RNTI, or one or more parameters in a calculation formula of the first RA-RNTI are different from one or more parameters in a calculation formula of a second RA-RNTI, where the second RA-RNTI is an RA-RNTI required for the second random access response to the second random access request on the second uplink carrier.

Specifically, after sending a PRACH preamble on a UL carrier, UE needs to monitor (monitor) a random access response RAR of a network. In NR, a control channel (NR-PDCCH) first needs to be detected before a random access response can be received. Transmission on a control channel is scrambled by using an RA-RNTI. Different RA-RNTIs may distinguish RARs corresponding to different preambles. If a SUL is supported for random access, compared with a dedicated UL carrier, an extra factor may be introduced into a formula of an RA-RNTI. The factor is associated with the SUL. In this way, it can be avoided that preambles on two ULs correspond to a same RA-RNTI. For example, if there is no SUL, the value range of an RA-RNTI is [x, y] (y>x≥0). For a preamble transmitted in a SUL, a factor Z (Z>y) may be added based on the foregoing technology to calculate an RA-RNTI, so that it can be avoided that two ULs correspond to a same RA-RNTI.

For example, for a dedicated UL carrier, the formula for calculating an RA-RNTI may be the foregoing Formula 1, Formula 2 or Formula 3, and Z may be added to Formula 1, Formula 2, and Formula 3 respectively to obtain formulas for calculation for a SUL carrier.

Certainly, Z may be not greater than y. In this case, instead of being completely avoided, a same RA-RNTI is less likely to occur.

Figure 7:
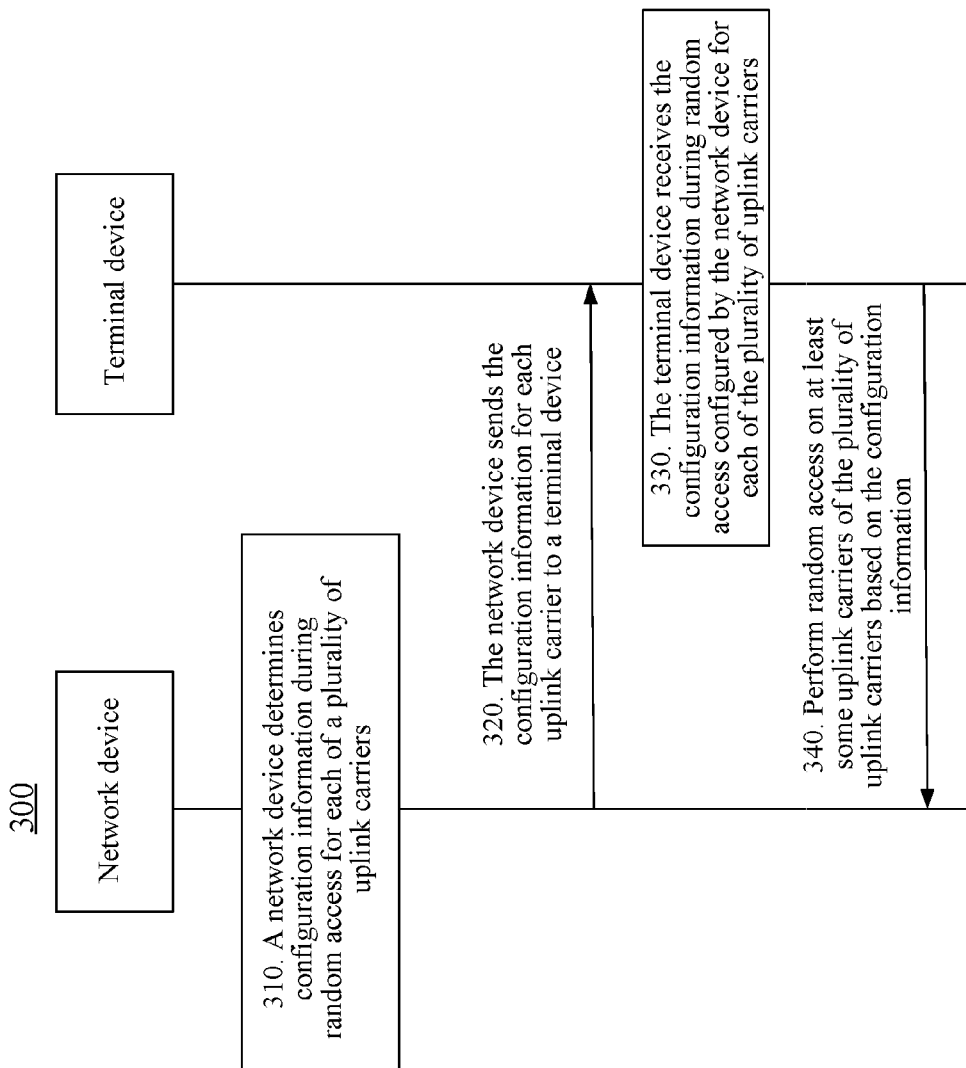
FIG. 7 is a schematic flowchart of a wireless communication method according to an embodiment of this application.

FIG. 7 is a schematic flowchart of a wireless communication method 300 according to an embodiment of this application. The method 300 includes at least some of the following content.

310. A network device determines configuration information during random access for each of a plurality of uplink carriers.

Optionally, the plurality of uplink carriers belongs to different frequency bands respectively.

320. The network device sends the configuration information for each uplink carrier to a terminal device.

330. The terminal device receives the configuration information during random access configured by the network device for each of the plurality of uplink carriers.

340. Perform random access on at least one uplink carrier of the plurality of uplink carriers based on the configuration information.

Therefore, the network device configures the configuration information during random access for each of the plurality of uplink carriers for the terminal device, so that during random access, the terminal device can use the configuration information corresponding to each uplink carrier to perform random access.

Optionally, the configuration information includes a time domain resource and/or a frequency domain resource used to send a random access request on each uplink carrier, where RA-RNTIs corresponding to time domain resources and/or frequency domain resources used to send a random access request on different uplink carriers are at least partially different.

Specifically, when configuring random access channel (Random Access Channel, RACH) resources correspond to different ULs, the network device coordinates a time and frequency resource and/or a frequency domain resource of a RACH, thereby avoiding that RA-RNTIs corresponding to preambles on two UL carriers conflict or reduce a probability that RA-RNTIs corresponding to the preambles conflict.

Optionally, at least one of the following configuration information during random access determined respectively for different uplink carriers is different:

a time frequency resource occupied by a random access request and/or a sequence included in a random access request;

a resource required to send a random access response; and a determining manner or one or more parameters of a random access radio network temporary identity for sending a random access response.

Optionally, the resource required to send the random access response includes: a control resource set CORESET or search space to which a control channel carrying the random access response belongs.

Optionally, control channels of random access responses corresponding to random access requests on different uplink carriers belong to different CORESETs or search spaces.

Optionally, RA-RNTIs for random access responses corresponding to random access requests on different uplink carriers have different calculation formulas or one or more different parameters in a calculation formula.

Optionally, the configuration information includes a configuration for the following: an indication of a random access request source in a random access response corresponding to a random access request transmitted on each uplink carrier.

Optionally, random access request source fields of random access responses corresponding to random access requests on different uplink carriers carry different information, where the random access request source field indicates an uplink carrier on which the random access request is located.

Optionally, the plurality of uplink carriers includes a first uplink carrier and a second uplink carrier, a first random access response carries a random access request source field, and a second random access response does not carry a random access request source field, where the first random access response is a response to a first random access request on the first uplink carrier, the second random access response is a response to a second random access request on the second uplink carrier, and the random access request source field indicates an uplink carrier on which the random access request is located is the first uplink carrier.

It should be understood that for the descriptions of the method 200 and the method 300, reference may be made to each other, and the method 200 and the method 300 may be used in combination. For brevity, details are not described herein again.

Figure 8:
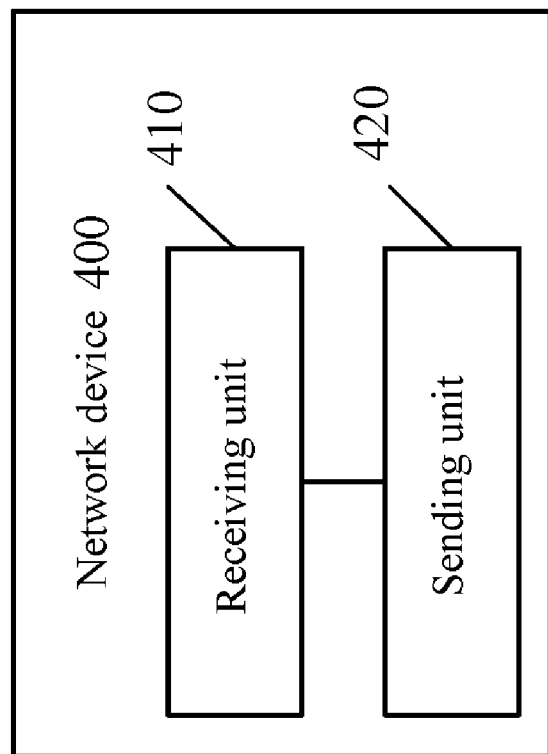
FIG. 8 is a schematic block diagram of a network device according to an embodiment of this application.

FIG. 8 is a schematic block diagram of a network device 400 according to an embodiment of this application. As shown in FIG. 8, the network device 400 includes a receiving unit 410 and a sending unit 420.

The receiving unit 410 is configured to receive a first random access request sent by a terminal device on a first uplink carrier. The sending unit 420 is configured to send a first random access response in response to the first random access request based on the first uplink carrier.

It should be understood that the network device 400 may perform corresponding operations performed by the network device in the foregoing method 200. For brevity, details are not described herein again.

Figure 9:
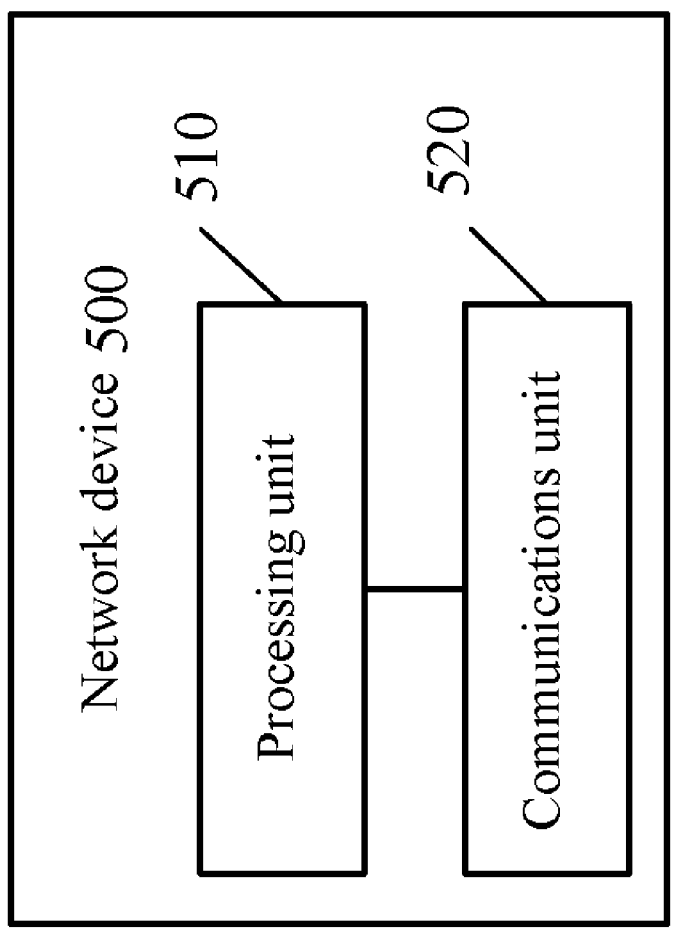
FIG. 9 is a schematic block diagram of a network device according to an embodiment of this application.

FIG. 9 is a schematic block diagram of a network device 500 according to an embodiment of this application. As shown in FIG. 9, the network device 500 includes a processing unit 510 and a communications unit 520.

The processing unit 510 is configured to determine configuration information during random access for each of a plurality of uplink carriers.

The communications unit 520 is configured to send the configuration information for each uplink carrier to a terminal device.

It should be understood that the network device 500 may perform corresponding operations performed by the network device in the foregoing method 300. For brevity, details are not described herein again.

Figure 10:
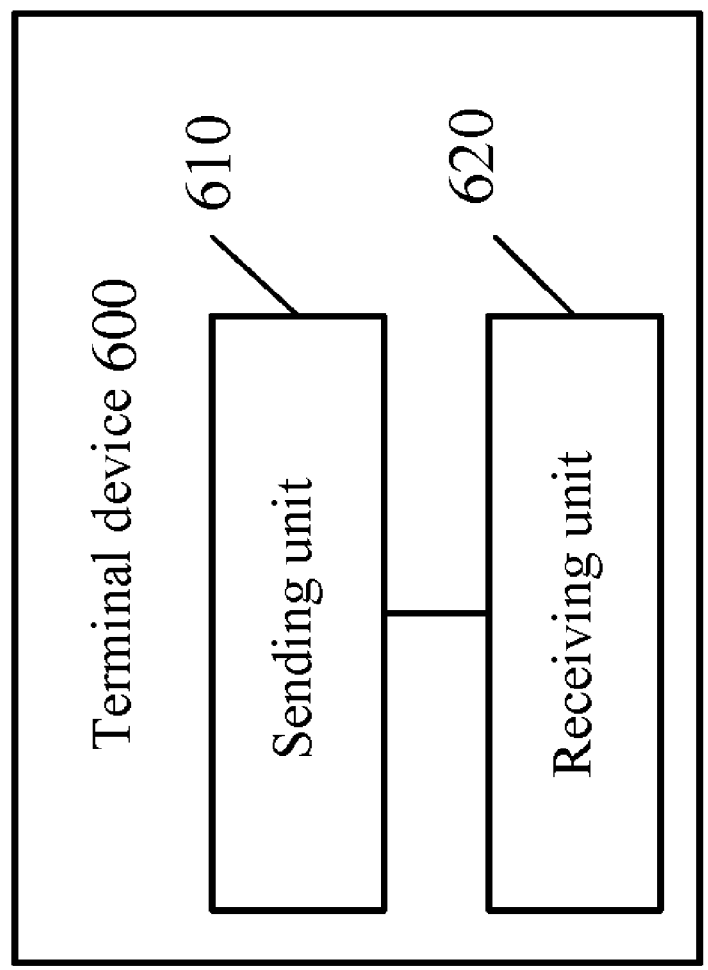
FIG. 10 is a schematic block diagram of a terminal device according to an embodiment of this application.

FIG. 10 is a schematic block diagram of a terminal device 600 according to an embodiment of this application. As shown in FIG. 10, the terminal device 600 includes a sending unit 610 and a receiving unit 620.

The sending unit 610 is configured to send a first random access request to a network device on a first uplink carrier. The receiving unit 620 is configured to acquire, based on the first uplink carrier, a first random access response sent by the network device in response to the first random access request.

It should be understood that the terminal device 600 may perform corresponding operations performed by the terminal device in the foregoing method 200. For brevity, details are not described herein again.

Figure 11:
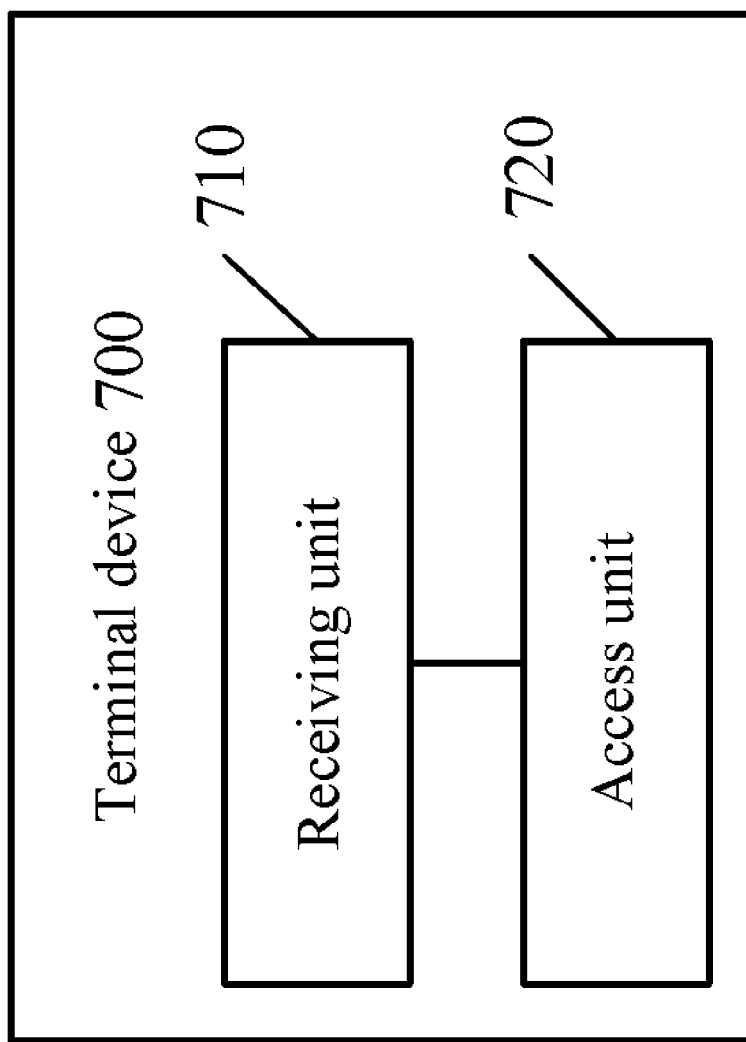
FIG. 11 is a schematic block diagram of a terminal device according to an embodiment of this application.

FIG. 11 is a schematic block diagram of a terminal device 700 according to an embodiment of this application. As shown in FIG. 11, the terminal device 700 includes a receiving unit 710 and an access unit 720.

The receiving unit 710 is configured to receive configuration information during random access configured by a network device for each of a plurality of uplink carriers. The access unit 720 is configured to perform random access on at least one uplink carrier of the plurality of uplink carriers based on the configuration information.

It should be understood that the terminal device 700 may perform corresponding operations performed by the terminal device in the foregoing method 300. For brevity, details are not described herein again.

Figure 12:
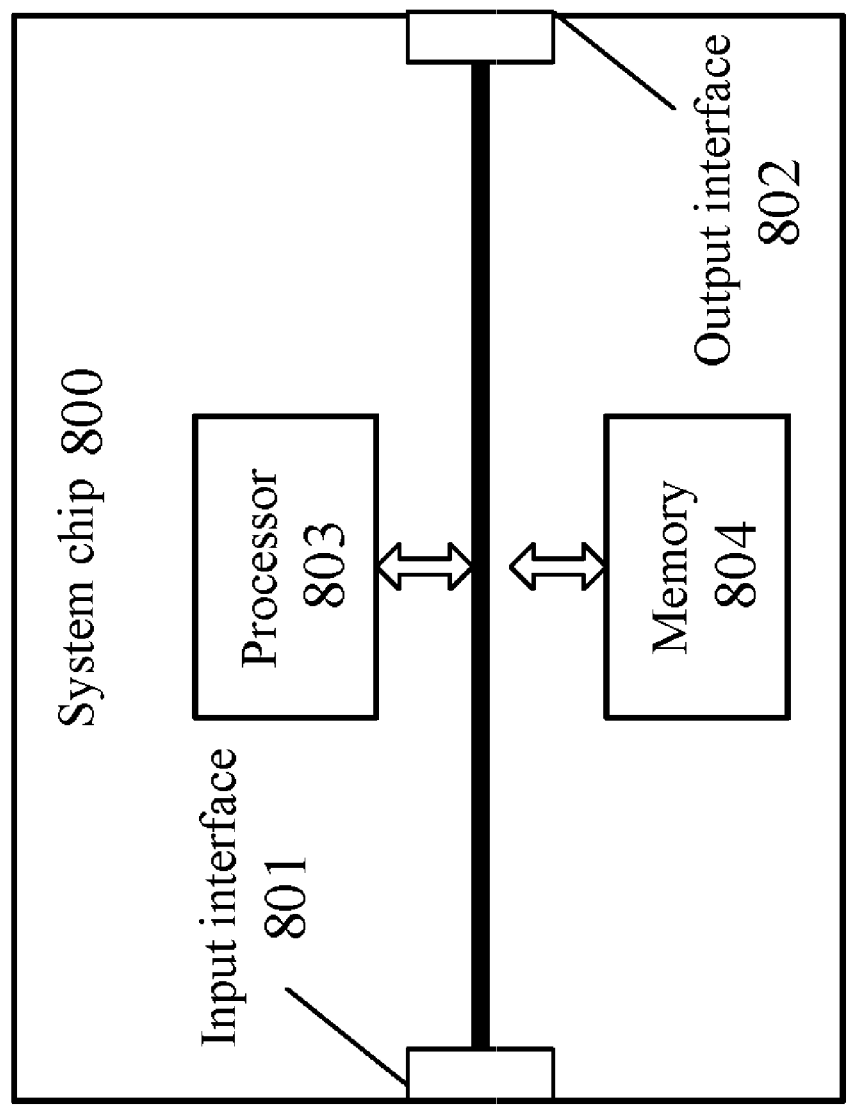
FIG. 12 is a schematic block diagram of a system chip according to an embodiment of this application.

FIG. 12 is a schematic structural diagram of a system chip 800 according to an embodiment of this application. The system chip 800 in FIG. 12 includes an input interface 801, an output interface 802, a processor 803, and a memory 804 that may be connected through an internal communication connection line, where the processor 803 is configured to execute code in the memory 804.

Optionally, when the code is executed, the processor 803 implements the method performed by a network device in the method embodiment. For brevity, details are not described herein again.

Optionally, when the code is executed, the processor 803 implements the method performed by a terminal device in the method embodiment. For brevity, details are not described herein again.

Figure 13:
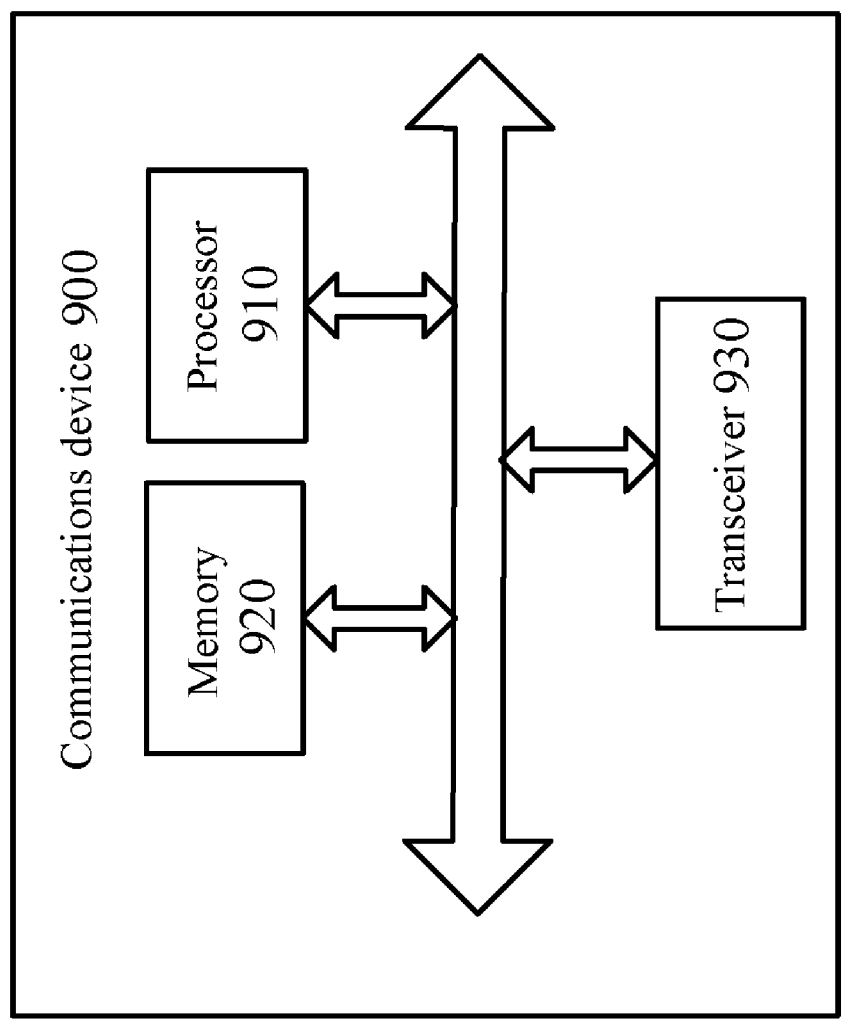
FIG. 13 is a schematic block diagram of a communications device according to an embodiment of this application.

FIG. 13 is a schematic block diagram of a communications device 900 according to an embodiment of this application. As shown in FIG. 13, the communications device 900 includes a processor 910 and a memory 920. The memory 920 may store program code, and the processor 910 may execute the program code stored in the memory 920.

Optionally, as shown in FIG. 13, the communications device 900 may include a transceiver 930, and the processor 910 may control the transceiver 930 to communicate externally.

Optionally, the processor 910 may invoke the program code stored in the memory 920 to perform corresponding operations of a network device in the method embodiment. For brevity, details are not described herein again.

Optionally, the processor 910 may invoke the program code stored in the memory 920 to perform corresponding operations of a terminal device in the method embodiment. For brevity, details are not described herein again.

It should be understood that the processor in the embodiments of this application may be an integrated circuit chip and has a signal processing capability. During implementation, the steps in the foregoing method embodiment may be implemented by using an integrated logic circuit of hardware in the processor or an instruction in the form of software. The processor may be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, or a discrete hardware component. The methods, steps, and logic block diagrams disclosed in the embodiments of this application may be implemented or performed. The general-purpose processor may be a microprocessor or the processor may alternatively be any conventional processor or the like. The steps in the methods disclosed with reference to the embodiments of this application may be directly performed or completed by a decoding processor embodied as hardware or performed or completed by using a combination of hardware and software modules in a decoding processor. The software module may be located at a random-access memory, a flash memory, a read-only memory, a programmable read-only memory or an electrically erasable programmable memory, a register or another mature storage medium in this field. The storage medium is located at a memory, and the processor reads information in the memory and completes the steps in the foregoing methods in combination with the hardware thereof.

It may be understood that the memory in the embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random-access memory (Random-access memory, RAM) and is used as an external cache. For exemplary rather than limitative description, many forms of RAMs can be used, for example, a static random-access memory (Static RAM, SRAM), a dynamic random-access memory (Dynamic RAM, DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchronous link dynamic random-access memory (Synchlink DRAM, SLDRAM), and a direct Rambus random-access memory (Direct Rambus RAM, DR RAM). It should be noted that the memories in the systems and methods described herein are intended to include, but are not limited to, these memories and memories of any other suitable type.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: any medium that can store program code, such as a USB flash disk, a removable hard disk, a read-only memory (Read-Only Memory, ROM), a random-access memory (Random-access memory, RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, the method comprising:
    sending, by a terminal device, a random access request to a network device on a high frequency uplink carrier or a supplementary uplink (SUL) carrier deployed at a frequency band lower than the high frequency uplink carrier; and
    acquiring, by the terminal device, a random access response (RAR) sent by the network device in response to the random access request,
    wherein acquiring, by the terminal device, the RAR sent by the network device in response to the random access request comprises:
        acquiring the RAR based on a random access radio network temporary identity (RA-RNTI) for the RAR, wherein a first RA-RNTI for the RAR of the SUL carrier is determined based on a calculation formula formed by adding, based on another calculation formula of a second RA-RNTI for the RAR of the high frequency uplink carrier, one factor associated with the SUL carrier, and
    wherein,
        when the random access request is sent on the high frequency uplink carrier, a value range of the first RA-RNTI is [x, y], where y>x≥0;
        when the random access request is sent on the SUL carrier, a value range of the second RA-RNTI is [x+Z, y+Z], where Z is the factor associated with the SUL carrier and greater than any value in a range from x to y.

2. The method according to claim 1, wherein the acquiring, by the terminal device, the RAR sent by the network device in response to the random access request further comprises:
    acquiring the RAR of the SUL carrier based on at least one of the following determined by the terminal device:
    a resource occupied by the RAR of the SUL carrier, and information for indicating a random access request source in the RAR of the SUL carrier.

3. The method according to claim 2, wherein the resource occupied by the RAR of the SUL carrier comprises: a control resource set (CORESET) or search space associated with a control channel carrying the RAR of the SUL carrier.

4. The method according to claim 3, wherein the CORESET or search space associated with the control channel carrying the RAR of the SUL carrier is different from a CORESET or search space associated with a control channel carrying the RAR of the high frequency uplink carrier.

5. The method according to claim 2, further comprising:
    receiving, by the terminal device, configuration information sent by the network device, wherein the configuration information is used to indicate at least one of a resource occupied to send the RAR of the SUL carrier, a determining manner or one or more parameters of the first RA-RNTI for the RAR of the SUL carrier, and information carried in the RAR of the SUL carrier.

6. A terminal device, comprising one or more processors, memory storing a plurality of programs to be executed by the one or more processors, an output interface and an input interface, wherein
    the output interface is configured to send a random access request to a network device on a high frequency uplink carrier or a supplementary uplink (SUL) carrier deployed at a frequency band lower than the high frequency uplink carrier; and the input interface is configured to acquire a random access response (RAR) sent by the network device in response to first random access request, wherein the input interface is configured to:
acquire the RAR based on a random access radio network temporary identity (RA-RNTI) for the RAR, wherein a first RA-RNTI for the RAR of the SUL carrier is determined based on a calculation formula formed by adding, based on another calculation formula of a second RA-RNTI for the RAR of the high frequency uplink carrier, one factor associated with the SUL carrier, and wherein,
when the random access request is sent on the high frequency uplink carrier, a value range of the first RA-RNTI is [x, y], where y>x≥0;
when the random access request is sent on the SUL carrier, a value range of the second RA-RNTI is [x+Z, y+Z], where Z is the factor associated with the SUL carrier and greater than any value in a range from x to y.

7. The terminal device according to claim 6, wherein the input interface is further configured to acquire the RAR of the SUL carrier based on at least one of the following determined by the terminal device:
a resource occupied by the RAR of the SUL carrier, and information for indicating a random access request source in the RAR of the SUL carrier.

8. The terminal device according to claim 7, wherein the resource occupied by the RAR of the SUL carrier comprises: a control resource set (CORESET) or search space associated with a control channel carrying the RAR of the SUL carrier.

9. The terminal device according to claim 8, wherein the CORESET or search space associated with the control channel carrying the RAR of the SUL carrier is different from a CORESET or search space associated with a control channel carrying the RAR of the high frequency uplink carrier.

10. The terminal device according to claim 7, the input interface is further configured to receive configuration information sent by the network device, wherein the configuration information is used to indicate at least one of a resource occupied to send the RAR of the SUL carrier, a determining manner or one or more parameters of the RA-RNTI for the RAR of the SUL carrier, and information carried in the RAR of the SUL carrier.

11. A network device, comprising one or more processors, memory storing a plurality of programs to be executed by the one or more processors, an output interface and an input interface, wherein
the input interface is configured to receive a random access request sent by a terminal device on a high frequency uplink carrier or a supplementary uplink (SUL) carrier deployed at a frequency band lower than the high frequency uplink carrier; and
the output interface is configured to send a random access response (RAR) in response to the random access request, wherein the output interface is further configured to:
send the RAR based on a random access radio network temporary identity (RA-RNTI) required to send the RAR, wherein a first RA-RNTI for the RAR of the SUL carrier is determined based on a calculation formula formed by adding, based on another calculation formula of a second RA-RNTI for the RAR of the high frequency uplink carrier, one factor associated with the SUL carrier, and, wherein,
when the random access request is sent on the high frequency uplink carrier, a value range of the first RA-RNTI is [x, y], where y>x≥0;
when the random access request is sent on the SUL carrier, a value range of the second RA-RNTI is [x+Z, y+Z], where Z is the factor associated with the SUL carrier and greater than any value in a range from x to y.

12. The network device according to claim 11, wherein the output interface is further configured to:
send the RAR of the SUL carrier based on at least one of the following determined by the network device:
a resource required to send the RAR of the SUL carrier, and information for indicating a random access request source in the RAR of the SUL carrier.

13. The network device according to claim 12, wherein the resource required to send the RAR of the SUL carrier comprises: a control resource set (CORESET) or a search space associated with a control channel carrying the RAR of the SUL carrier.

14. The network device according to claim 13, wherein the CORESET or the search space corresponding to the control channel carrying the RAR of the SUL carrier is different from a CORESET or a search space corresponding to a control channel carrying the RAR of the high frequency uplink carrier.

15. The network device according to claim 12, the output interface is further configured to send configuration information to the terminal device, wherein the configuration information is used to indicate at least one of a resource occupied to send the RAR of the SUL carrier, a determining manner or one or more parameters of the RA-RNTI for the RAR of the SUL carrier, and information carried in the RAR of the SUL carrier.

16. A wireless communication method, the method comprising:
receiving, by a network device, a random access request sent by a terminal device on a high frequency uplink carrier or a supplementary uplink (SUL) carrier deployed at a frequency band lower than the high frequency uplink carrier; and
sending, by the network device, to the terminal device a random access response (RAR) in response to the random access request,
wherein sending, by the network device, to the terminal device the RAR in response to the random access request comprises:
sending the RAR based on a random access radio network temporary identity (RA-RNTI) required to send the RAR, wherein a first RA-RNTI for the RAR of the SUL carrier is determined based on a calculation formula formed by adding, based on another calculation formula of a second RA-RNTI for the RAR of the high frequency uplink carrier, one factor associated with the SUL carrier, and, wherein,
when the random access request is sent on the high frequency uplink carrier, a value range of the first RA-RNTI is [x, y], where y>x≥0;
when the random access request is sent on the SUL carrier, a value range of the second RA-RNTI is [x+Z, y+Z], where Z is the factor associated with the SUL carrier and greater than any value in a range from x to y.

17. The method according to claim 16, wherein the sending, by the network device, to the terminal device the RAR in response to the random access request comprises further comprises:
   sending the RAR of the SUL carrier based on at least one of the following determined by the network device:
   a resource required to send the RAR of the SUL carrier, and information for indicating a random access request source in the RAR of the SUL carrier.

18. The method according to claim 17, wherein the resource required to send the RAR of the SUL carrier comprises: a control resource set (CORESET) or a search space associated with a control channel carrying the RAR of the SUL carrier.

19. The method according to claim 18, wherein the CORESET or the search space corresponding to the control channel carrying the RAR of the SUL carrier is different from a CORESET or a search space corresponding to a control channel carrying the RAR of the high frequency uplink carrier.

20. The method according to claim 17, further comprising:
   sending configuration information to the terminal device, wherein the configuration information is used to indicate at least one of a resource occupied to send the RAR of the SUL carrier, a determining manner or one or more parameters of the RA-RNTI for the RAR of the SUL carrier, and information carried in the RAR of the SUL carrier.

* * * * *